3,699,040
METHOD FOR WASTE DISPOSAL WITH
CENTRIFUGAL ACTION
James S. Reid, Hudson, Ohio, assignor to Thermason
Corporation, Ann Arbor, Mich.
Continuation-in-part of application Ser. No. 81,813,
Oct. 19, 1970. This application Apr. 21, 1971, Ser.
No. 135,850
Int. Cl. B01d 15/06, 33/16, 35/18
U.S. Cl. 210—32                    11 Claims

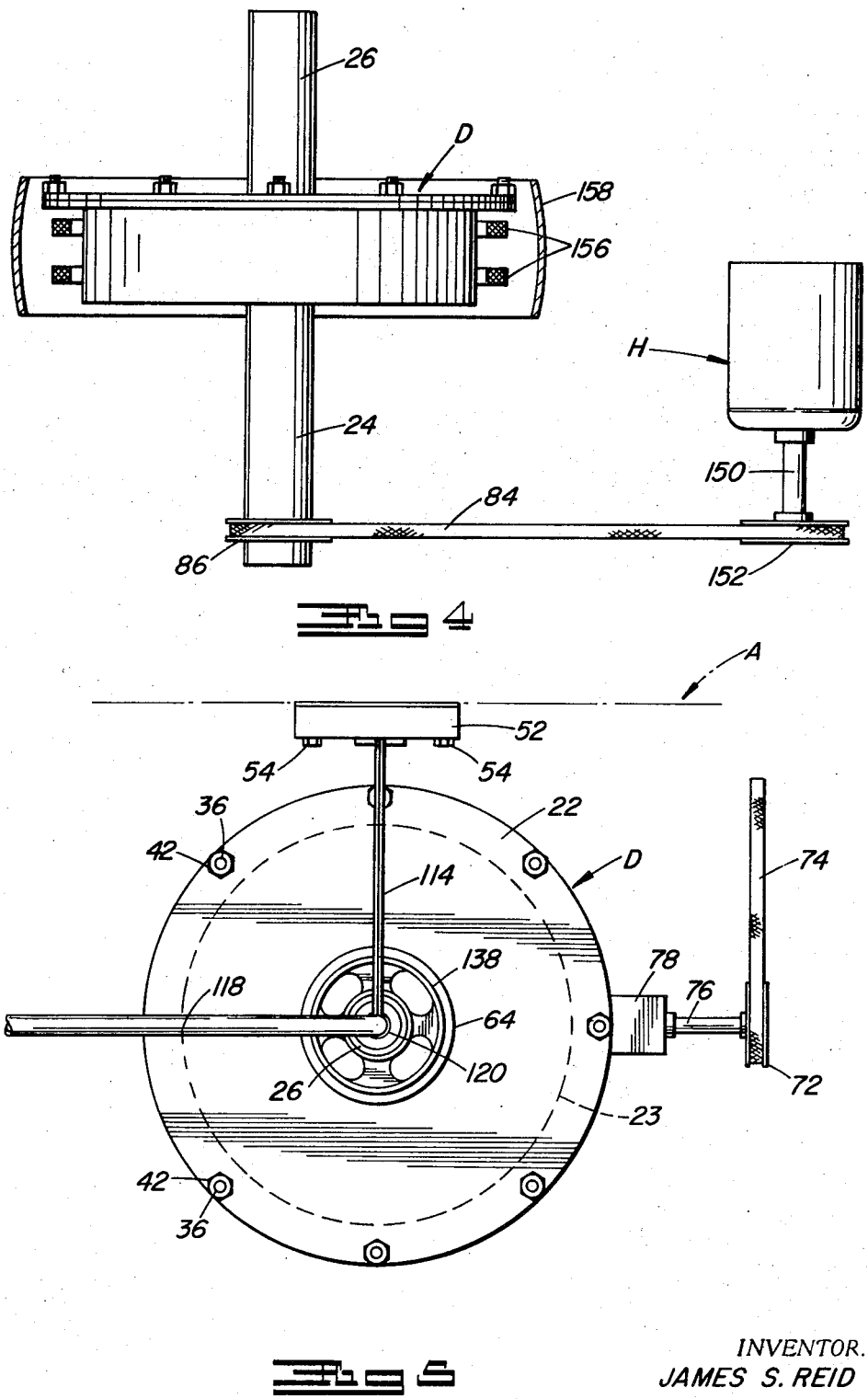

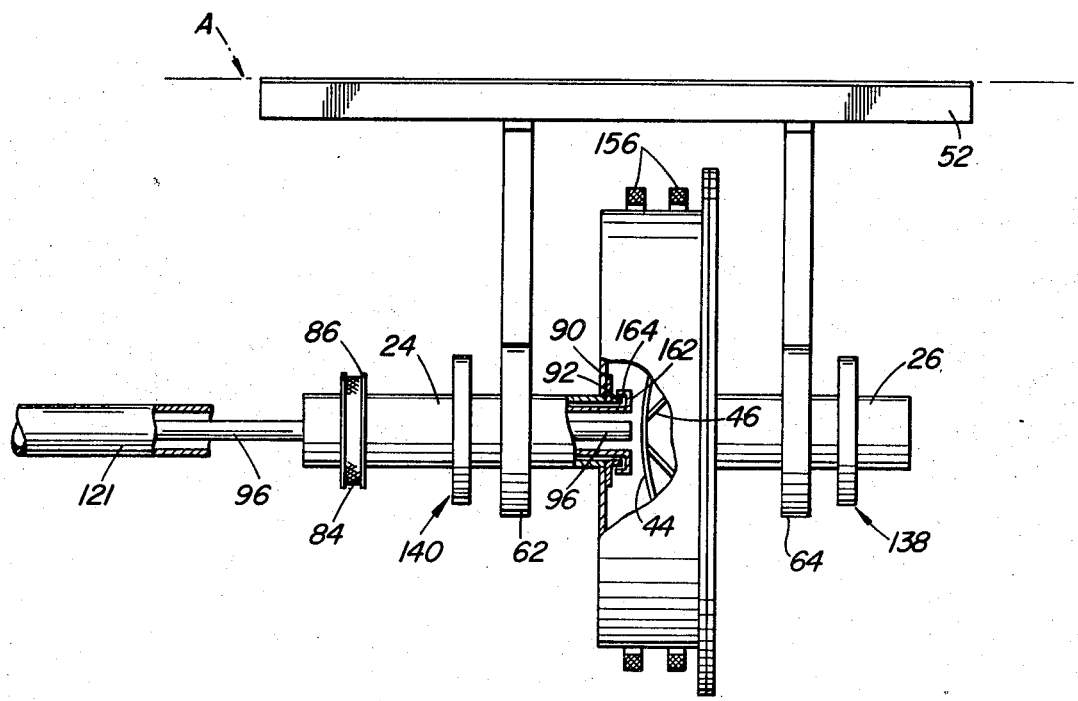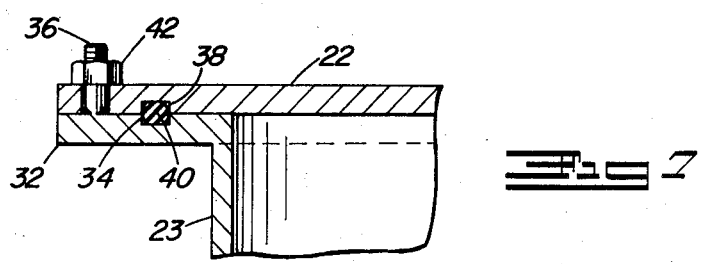

ABSTRACT OF THE DISCLOSURE

An apparatus and a method for waste disposal with centrifugal action includes centrifugal vaporizing means for subjecting liquid and organic waste material to centrifugal force while vaporizing the waste material. Organic material is forced below the surface of the liquid waste material by centrifugal force. The vaporizing means is heated while centrifugal force is acting on the waste material so that substantially pure liquid is turned into vapor and substantially no organic material is carried from the vaporizing means with the vapor.

BACKGROUND OF THE INVENTION

This application is a continuation-in-part of U.S. patent application Ser. No. 81,813, filed Oct. 19, 1970, and now abandoned.

This application pertains to the art of waste disposal and more particularly to disposal of liquid and organic waste material by vaporization. The invention is particularly applicable to waste disposal systems of the type utilizing waste heat from a fuel burning engine, and will be described with particular reference thereto, although it will be appreciated that the invention has broader applications and may be used in systems having other sources of heat.

In a known type of waste disposal apparatus, such as that described in U.S. Pat. Re. 26,891 issued May 6, 1970, liquid and organic waste material is fed through a vaporizing means defined by a boiler. The boiler may be heated by an electric heating element; by a gas burner; or by waste heat from a fuel burning engine. Heating of the boiler causes the waste liquid to boil so that it is vaporized, and the vapor is directed to an outlet conduit which is either open to atmosphere or connected with the exhaust pipe of a fuel burning engine.

In apparatus of the type described, the liquid and organic waste material is fed to the boiler from a waste tank in which septic action occurs. The septic action may be either aerobic or anaerobic, and such bacteriological action partially decomposes the organic waste material.

As is well known, ordinary sewage may look and smell foul but is actually more than 99 percent water. The average amount of dry feces produced per person per day has been estimated at around 20 to 28 grams. The average amount of dry matter produced per person per day in urine amounts to 43 to 54 grams. The ash content of feces is low, and averages only 12 to 15 percent of the total dry solids, while the average ash content of urine solids may be as high as 18 percent. The ash in feces and urine is due principally to sodium chloride, and also contains phosphates, and salts of calcium and magnesium. The organic matter in feces and urine is principally carbon and nitrogen in various forms. Other wastes delivered to the waste tank include paper, fibrous material, food particles, grease, salt, sugar, sand, dirt, starch and garbage.

Bacteria present in a septic tank are capable of liquefying and splitting the complex organic constituents of sewage. This results in the production of soluble intermediate and gaseous end products which are responsible for odors. Under aerobic conditions, the main products of decomposition of carbonaceous organic materials will be carbon dioxide and water. Under anaerobic conditions, a number of intermediate and end products are formed, such as ammonia, amino-acids, amides, peptones, hydrogen sulfide, indole, skatole and mercaptans. In both types of bacteriological action, certain amounts of sludge remain undigested. The bacteria and protozoa present in the sewage are themselves a source of organic material. In a properly operating septic tank, the material in the tank includes a bottom layer of sludge and liquid having a high concentration of organic solids; a middle layer which is relatively clear compared to the bottom layer; and a top layer of floating solids and foam. In waste disposal systems of the type described, it is common to draw liquid from the septic tank at the middle layer. A filter is usually provided to strain out large particles. If the filter is highly effective, it will become clogged very rapidly. Therefore, the filter is often of a type which allows smaller organic particles to pass therethrough. The formation of gases during septic action, and suspension of minute organic particles in the middle layer, usually causes feeding of certain organic solids and bacteria to the boiler from the waste tank. In the boiler, violent boiling occurs but the temperature of the liquid does not rise substantially above 212° F. During this violent boiling, live bacteria and minute organic particles may be carried with the vapor out the exhaust conduit of the boiler. The temperature reached during boiling may not be high enough to completely sterilize organic particles and kill bacteria. In addition, the violent action often causes formation of foam within the boiler and bubbles of rather polluted liquid may be discharged from the boiler.

SUMMARY OF THE INVENTION

A waste disposal system of the type described is provided with a boiler which is rotated at a high angular velocity in order to subject liquid and organic waste in the boiler to centrifugal force. The centrifugal force causes solid particles to sink below the surface of the liquid. The boiler is heated while it is being rotated so that boiling of the liquid occurs at a surface which is relatively free of organic material. The concentration of solid particles beneath the surface of the liquid also raises the boiling point of the polluted mixture so that sterilization is more readily accomplished.

In one arrangement, the centrifugal boiler comprises a substantially cylindrical container having centrally located openings at its end portions. Cylindrical tubes are secured to the boiler adjacent the openings and the tubes are rotatably mounted in bearings. A pulley is connected with one of the tubes, and a drive belt connected with the pulley rotates the centrifugal boiler at a high angular velocity. The angular velocity at which the centrifugal boiler is driven is preferably substantially greater than the critical speed thereof.

One of the openings in the centrifugal boiler defines an inlet opening through which liquid and organic waste material is fed by a pump from a waste tank. A deflector member is positioned within the centrifugal boiler adjacent the outlet from the pump so that liquid and organic waste material fed to the boiler is thrown outwardly under centrifugal action by the deflector. The other opening in the centrifugal boiler defines an outlet opening for steam.

In accordance with a preferred arrangement, a basket of activated adsorbent is positioned within the boiler so that waste material fed to the boiler is filtered through the adsorbent before it is vaporized. This reduces odor in the steam discharged from the boiler and also traps minute organic particles where they can be subjected to very high heat.

It is an object of the present invention to provide an improved method for vaporizing waste material by subjecting such waste material to centrifugal action during vaporization thereof.

It is an additional object of the present invention to provide an improved method for disposing of waste material by filtering such waste material through an adsorbent positioned within a vaporizer.

It is also an object of the present invention to provide an improved method for disposing of waste material by using an adsorbent within a vaporizer and operating the vaporizer at high temperatures in the absence of liquid to incinerate organic waste and at least partially reactivate the adsorbent.

It is another object of the present invention to provide an improved method for disposing of waste material by filtering such waste material through an adsorbent positioned within a boiler and further providing means for feeding air to the boiler for oxidizing organic wastes and reactivating the adsorbent.

BRIEF DESCRIPTION OF THE DRAWING

The apparatus for carrying out the process of the invention may take physical form in certain parts and arrangements of parts, a preferred embodiment of which will be described in detail in this specification and illustrated in the accompanying drawings which form a part hereof.

FIG. 4 is a side elevational view of the improved waste disposal apparatus, and showing another arrangement for heating and driving;

FIG. 5 is a top plan view looking in the direction of arrows 5—5 of FIG. 1;

FIG. 6 is a side elevational view showing another mounting arrangement of the improved apparatus;

FIG. 7 is a partial cross-sectional elevational view showing an edge portion of the improved centrifugal boiler;

DESCRIPTION OF THE PREFERRED EMBODIMENT

Figure 1:
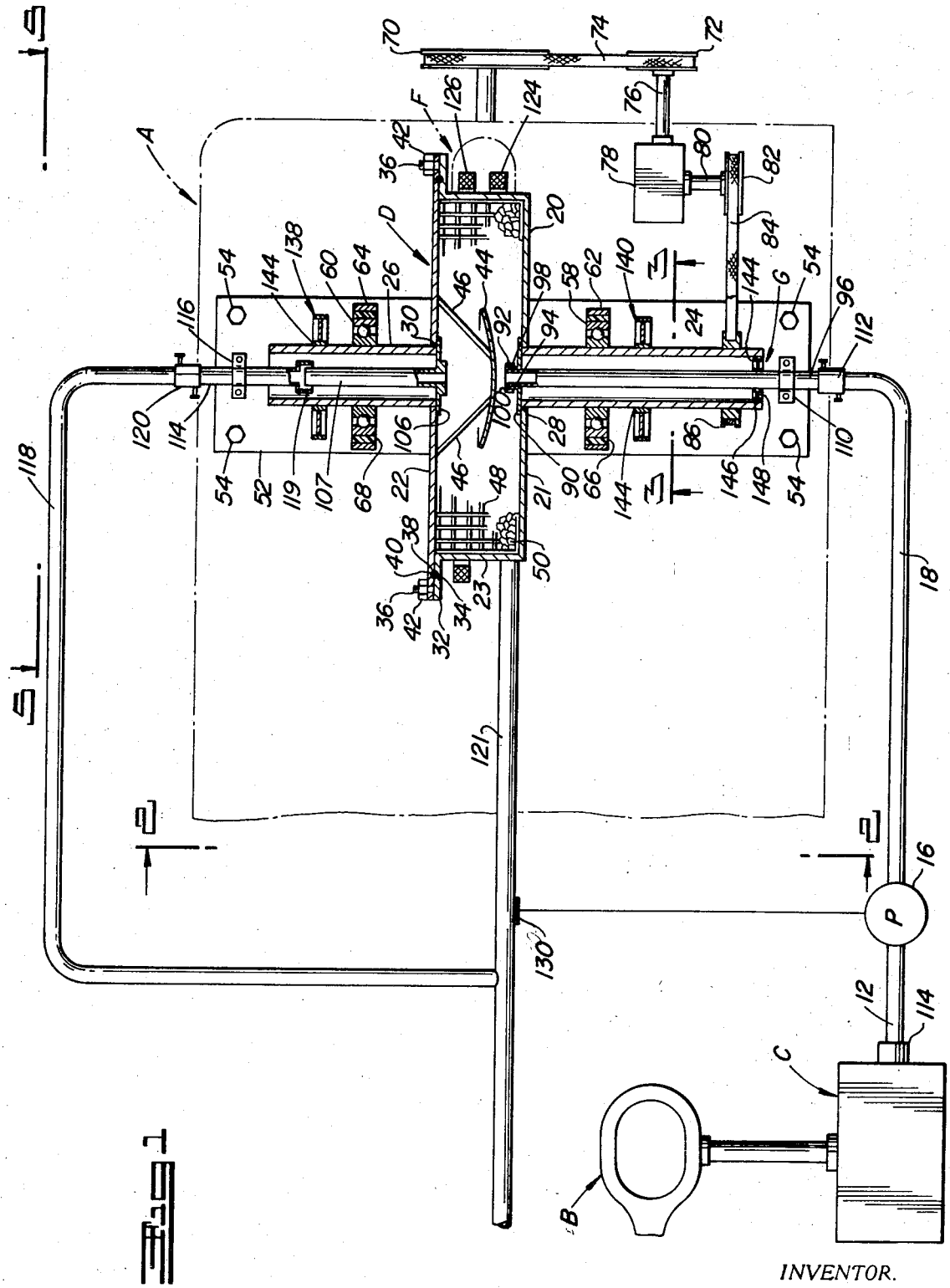
FIG. 1 is a side elevational view showing the improved waste disposal apparatus and with portions in section for clarity of illustration.
Figure 2:
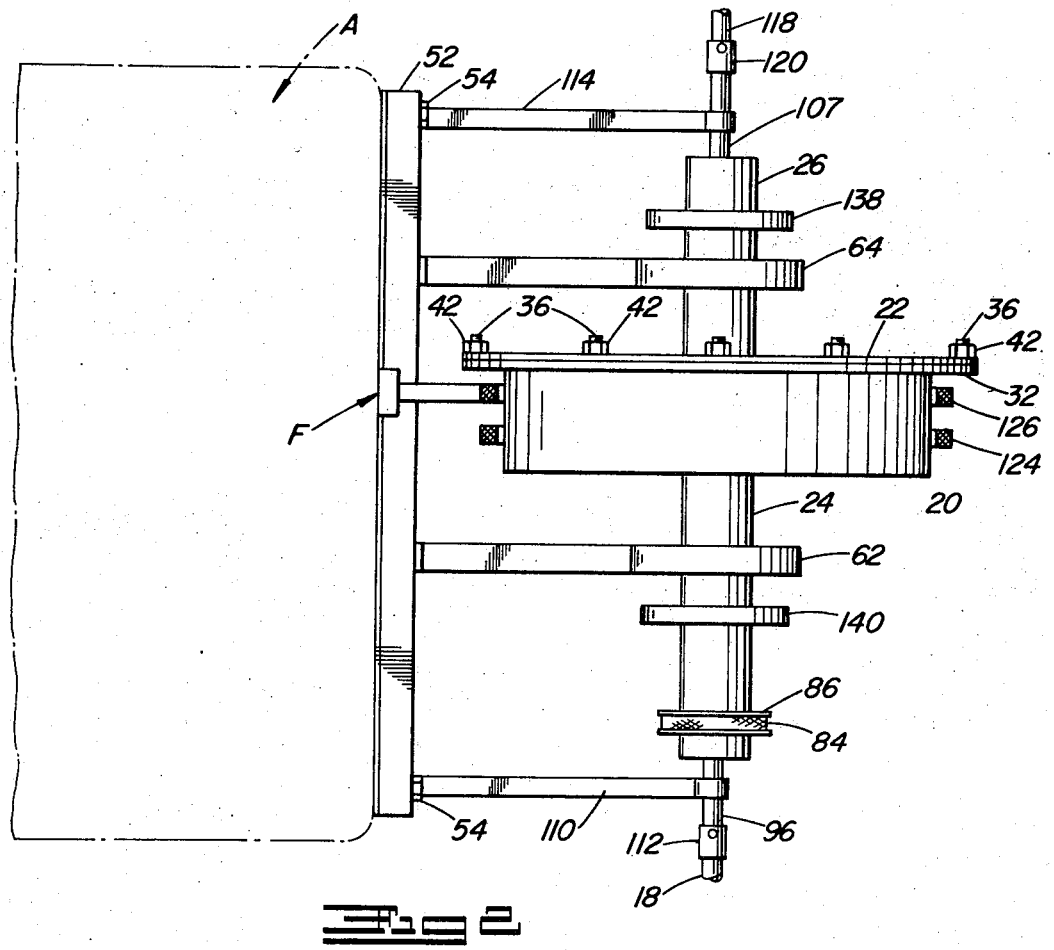
FIG. 2 is an elevational view looking in the direction of arrows 2—2 of FIG. 1.
Figure 3:
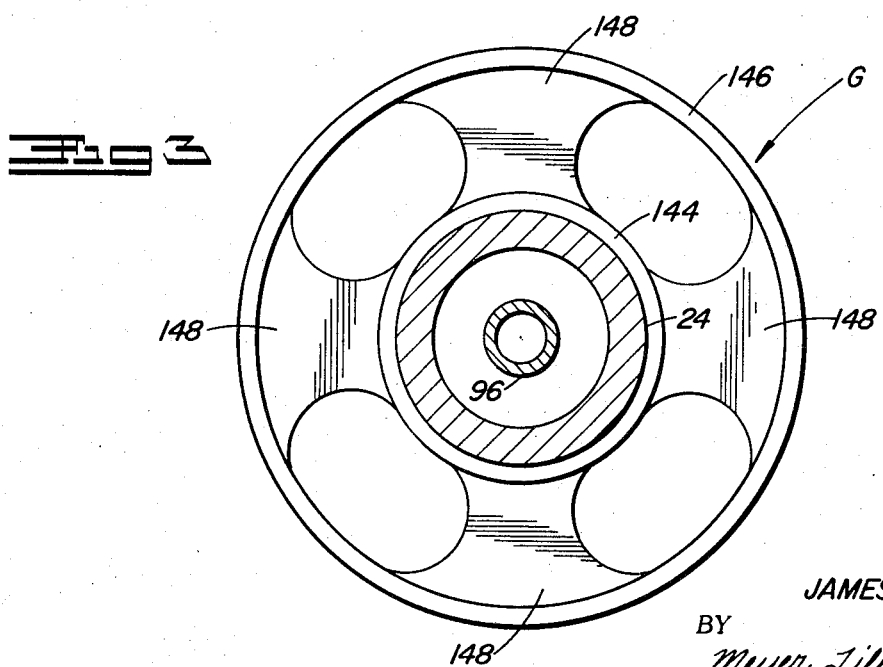
FIG. 3 is a bottom view looking in the direction of arrows 3—3 of FIG. 1.

Referring now to the drawings, wherein the showings are for purposes of illustrating the preferred embodiment of the invention only and not for purposes of limting same, FIG. 1 shows a fuel burning engine A which may be the source of motive power for a human conveyance such as an airplane, a boat, a bus, a camping trailer or the like. It will be recognized that engine A may also be a fuel burning engine for driving an electric generator either on a human conveyance of the type described or in a fixed installation.

The conveyance or fixed installation includes a toilet B which discharges into holding tank C. It will be understood that other sources of liquid and organic waste, such as a shower, a kitchen sink and a wash basin may also discharge into holding tank C. In other installations waste material may be fed to holding tank C from a laundry room. Aerobic or anaerobic bacteriologocial action occurs in tank C to partially convert organic solids into liquid and partially purify the effluent discharged into holding tank C.

An outlet conduit 12 is connected with holding tank C mid-way between the top and bottom thereof and a filter 14 is provided for trapping relatively large solid particles to prevent them from entering conduit 12. Liquid and organic waste material is fed from holding tank C by pump 16 through conduit 18 to centrifugal vaporizing means or boiler D.

In accordance with one arrangement, centrifugal vaporizing means D includes a cylindrical dished bottom portion 20 and a circular flat upper portion 22. Bottom portion 20 includes a bottom wall 21 and a peripheral side wall 23. Bottom portion 20 and top portion 22 each have a cylindrical tube 24 and 26 welded or otherwise suitably secured thereto in a centrally located position. Bottom wall 21 of bottom portion 20 is provided with a circular hole 28 therethrough in alignment with cylindrical tube 24, and top portion 22 is provided with a centrally located circular hole 30 in alignment with cylindrical tube 26.

In one arrangement, the upper peripheral edge of side wall 23 on bottom portion 20 is provided with a circular flange 32 extending radially outward therefrom. Flange 32 has a circumferential groove 34 formed in the upper surface thereof for receiving a gasket. A plurality of circumferentially spaced threaded studs 36 are welded to the upper surface of the outer portion of flange 32 outwardly of groove 34. Upper portion 22 of centrifugal vaporizing means D includes a circumferential groove 38 which cooperates with circumferential groove 34 to compress a high temperature gasket 40, such as of asbestos or the like, to seal the interior of centrifugal vaporizing means D. Outwardly of circumferential groove 38, upper portion 22 has a plurality of circumferentially spaced holes therethrough for receiving threaded studs 36. Bolts 42 are threaded onto studs 36 to tightly clamp upper portion 22 to lower portion 20 and compress gasket 40 with grooves 34 and 38.

In accordance with a preferred arrangement, deflector means in the form of a circular disc 44 is positioned within centrifugal vaporizing means D as by three or more rods 46 welded to the bottom surface of upper portion 22 and to the rear face of deflector means 44. Deflector means 44 may be slightly curved upwardly as shown in FIG. 1. In a preferred arrangement, centrifugal vaporizing means D is formed of a material which is non-corrosive at high temperatures and when exposed to corrosive materials found in sewage. Steel having a high nickel content is one suitable material.

Positioned within bottom portion 20 of vaporizing means D is an annular wire basket 48 which is also of non-corrosive material. Basket 48 holds powdered or granular adsorbent material 50 such as activated charcoal or the like. It will be recognized that bolts 42 may be removed to lift upper portion 22 from bottom portion 20 for replacing basket 48 and adsorbent 50. It will also be recognized that the centrifugal vaporizing means of the present invention may be a completely sealed unit with welded seams so that it cannot be taken apart. In such an arrangement, basket 48 may be sealed inside with adsorbent material or basket 48 and adsorbent material 50 may be omitted.

In the arrangement shown, a support member 52 is attached to the block of engine A as by bolts 54. It will be recognized by those skilled in the art that centrifugal vaporizing means D may be mounted on any suitable support removed from engine A such as on the floor or side wall of the engine compartment of a human conveyance; to the body structure of the conveyance in a location removed from the engine compartment; or on another support structure positioned adjacent the fuel burning engine of an electric generator or the like in a fixed installation.

Centrifugal vaporizing means D is mounted for rotation at a high angular velocity. More specifically, bearings 58 and 60 are supported by brackets 62 and 64 which are secured to support 52. Bearings 58 and 60 rotatably support cylindrical tubes 24 and 26. Bearings 58 and 60 may be supported in brackets 62 and 64 by elastomeric material 66 and 68 so that bearings 58 and 60 will be self-aligning. Conventional pulley 70, which is normally provided on an engine for driving a cooling fan, generator, or water pump, drives another pulley 72 through belt 74. Pulley 72 drives shaft 76 of a right angle gear unit 78 having an output shaft 80 driving pulley 82 which in turn is drivingly connected by belt 84 to pulley 86 secured to cylindrical tube 24. Gear unit 78 has a gear ratio which speeds up rotation of shaft 76 so that centrifugal vaporizing means D is rotated at an angular velocity of around at least 10,000 r.p.m.

In a preferred arrangement, centrifugal vaporizing means D is driven at an anguar velocity which is at least greater than the critical speed thereof. It will be recognized that cylindrical tubes 24 and 26 define a rotating shaft and the other components of centrifugal vaporizing means D define a weight attached to the shaft. As is well known, the critical speed of a rotating shaft is the speed at which its elastic forces are completely neutralized so that it is incapable of offering any resistance to a deflecting force. This speed is numerically equal to the frequency of vibration of the shaft with the weights mounted on it, if deflected by an external force while the shaft is at a standstill. The value of the critical speed depends upon the length of the shaft, its various diameters, the manner in which it is supported, and the magnitude and distribution of loads it carries. However, the critical speed is independent of whether the shaft is horizontal or vertical. At speeds above the critical speed, the center of gravity of the rotating mass approaches the straight line joining the bearings and the deflected shaft rotates about the center of gravity of the rotating mass. As is well known, a shaft may have as many critical speeds as the number of loads it carries. In the arrangement of the present invention, centrifugal vaporizing means D will rotate with liquid and organic waste material therein, and without any liquid or organic waste material therein. In the preferred arrangement, centrifugal vaporizing means is rotated at an angular velocity which exceeds the critical speed of any variable arrangement so that vibration will be substantially eliminated. Solid particles entering vaporizing means D may sometimes be at least partially buoyant. However, water is virtually incompressible and its density will not be materially increased by centrifugal force when rotated in centrifgugal vaporizing means D. In any event, the speed of centrifugal vaporizing means D must be extremely high so that the centrifugal force acting on minute buoyant particles will carry such particles below the surface of the liquid in vaporizing means D and toward outer peripheral wall 23.

In accordance with a preferred arrangement, a circular baffle member 90 is welded or otherwise secured to the inner surface of bottom wall 21 on bottom portion 20 adjacent opening 28. Baffle member 90 has a circular upstanding flange 92 defining a circular opening 94 through baffle member 90. Conduit 96 feeds waste material to the interior of centrifugal vaporizing means D and extends upwardly through cylindrical tube 24. The upper end of conduit 96 has an outwardly extending flange 98 and a downwardly extending cylindrical flange 100 which overlaps flange 92. In a preferred arrangement, flange 100 is spacerd radially outward from flange 92 and flange 92 is spaced radially outward from conduit 96. In addition, the top edge of flange 92 is spaced downwardly from outwardly extending flange 98 so that there is no contact between any rotating parts and stationary parts. With the arrangement shown, any liquid dripping from deflector 44, or simply running outwardly from the outlet end of conduit 96, will simply remain in centrifugal vaporizing means D or fall back into conduit 96. The baffling arrangement described prevents liquid from flowing out of cylindrical tube 24.

Centrifugal vaporizing means D includes an outlet conduit 107 having a circular flange 106 welded or otherwise suitably secured to the inner surface of upper portion 22 adjacent opening 30. Outlet member 107 includes a cylindrical tube portion extending upwardly through cylindrical tube 26 and spaced radially inward therefrom.

In one arrangement, conduit 96 is secured to bracket 110 which is attached to support 52. Conduit 96 is connected with conduit 18 from pump 16 by a suitable coupling 112. An outlet conduit 114 is secured to bracket 116 which is attached to support 52. Outlet conduit 114 is attached to conduit 118 by a suitable coupling 120. Conduit 118 is connected to exhaust pipe 121 from engine A so that vapor formed within vaporizing means D and discharging through conduit 107 also flows through outlet conduit 114 and conduit 118 to exhaust pipe 121 for discharge to atmosphere along with exhaust gases from engine A. It will be recognized that conduit 114 may also be open to atmosphere. Conduit 114 extends downwardly into cylindrical tube 26 and includes an enlarged end portion having a cylindrical flange 119 which overlaps the upper end portion of outlet conduit 107. With this arrangement, condensation of steam within outlet conduit 114 will result in dripping of condensate from flange 119 down on to flange 106. Such condensate is already substantially purified and will simply again be vaporized on flange 106 to exit out of cylindrical tube 26. Such vapor will have been purified two times and is minimal in amount so that discharge through cylindrical tube 26 is no consequence. It will be recognized that flange 119 is spaced radially inward from the inner wall of cylindrical tube 26 and is spaced radially outward from the outer surface of outlet conduit 107 so there is no contact between rotating and stationary parts.

In accordance with one arrangement, exhaust manifold F of engine A is connected to an exhaust pipe which is formed into a coil to surround outer peripheral wall 23 of centrifugal vaporizer D as with coils 124 and 126. The last coil then simply extends to connection with exhaust tailpipe 121. In a spark ignition internal combustion engine, the exhaust gases are at a temperature of around 1000–1500° F. immediately upon exiting from the combustion cylinders. These exhaust gases flow through coils 124 and 126 which become extremely hot and radiate heat to outer peripheral wall 23 of centrifugal vaporizing means D. Coils 124 and 126 are preferably spaced radially outward from outer peripheral wall 23 so that there will be no contact between rotating and stationary parts. After operation for a time, centrifugal vaporizing means D may reach a temperature of around 1000° F. in the absence of any liquid therein.

In a preferred arrangement, pump 116 is electrically operated and is controlled by a thermocouple probe 130 connected with exhaust tailpipe 121 so as to be sensitive to the temperature of the pipe or of the exhaust gases flowing therethrough. Thermocouple 130 is of a type which will close only when exhaust pipe 121 is at a high temperature such as around 800° F. In addition, the outlet of pump 16 is preferably sized so as to meter effluent into centrifugal vaporizing means D at a constant rate which corresponds to the rate at which vaporization can take place within centrifugal vaporizing means D. This rate will depend upon the variable size of centrifugal vaporizing means D and the facility with which it is used. For example, use of centrifugal vaporizing means D on a passenger ship will require a relatively large unit, or several relatively large units. On the other hand, use of centrifugal vaporizing means D on a pleasure boat or a camping trailer will require a much smaller unit because the amount of waste material produced by a few persons is relatively small. On a pleasure boat or camping trailer, it is possible that centrifugal vaporizing means D need be only around six inches in diameter to vaporize liquid at a rate of one quart per hour. In such an arrangement, the outlet of pump 16 is sized so as to meter effluent into centrifugal vaporizing means D at a rate of around one quart per hour.

In operation, closing of thermocouple 130 begins operation of pump 16 to transfer liquid and organic waste material from waste tank C to discharge out of conduit 96 against deflector member 44. Deflector member 44 will throw the waste material radially outward against outer peripheral wall 23 of centrifugal vaporizing means D. Such waste material is filtered through adsorbent material 50 within centrifugal means d. As is well known, centrifugal force acting on a rotating mass is determined in accordance with the formula $Mrw^2$; where M is the mass of the body; $r$ is the distance from the axis of rotation to the center of mass; and $w^2$ is the square of the angular velocity of the mass radians per second. The centrifugal force acting on organic particles in the liquid fed to centrifugal vaporizing means D will carry such particles to the outer periphery of centrifugal vaporizing means D. The centrifugal force acting on the particles will force the particles below the surface of the liquid waste material so that the surface of the liquid waste material is substantially free of solids. Boiling then occurs at the surface of the liquid waste material to produce vapor which is substantially free of solids or pollutants. The vapor produced is then discharged through conduit 107 to conduits 114 and 118. The baffling arrangement with flanges 92 and 100 offers a much smaller exit opening for steam than does conduit 107 so that all of the steam will flow upward out conduit 107 rather than downwardly past the baffling arrangement into cylindrical tube 24. Positioning of centrifugal vaporizing means D for rotation on a vertical axis also locates the outlet conduit at the upper end in its natural position position for upward flow of steam which is formed within centrifugal vaporizing means D.

As operation of the waste disposal continues, the level of waste material in waste tank C will drop below the outlet of conduit 12, or instructions supplied to the user will instruct him to turn the pump master switch off at periodic intervals, such as around once a week, to stop operation of pump 16. Continued operation of centrifugal vaporizing means D will then result in complete vaporization of all the liquid. As the liquid is vaporized, the remaining solution will become more concentrated with solid particles so that the boiling point thereof is highly increased. Therefore, boiling of the more concentrated liquid and solid material occurs at a much higher temperature so that more effective sterilization is accomplished when a high concentration of pollutants is present. Eventually, all of the liquid will be vaporized from the waste material within centrifugal vaporizing means D and only solids will remain. The temperature of centrifugal vaporizing means D will then continue to rise, and may reach a temperature of around 1000° F. This high temperature will completely incinerate any bacteria and organic solids remaining in centrifugal vaporizing means D and completely sterilize such materials. There will then be only a residue of ash and minerals within centrifugal vaporizing means D. The previously described odor producing gases and other contaminants will also have been adsorbed on activated charcoal 50. At the high temperature reached in centrifugal vaporizing means D in the absence of liquid, some of these contaminants and odor producing compounds will be driven from adsorbent 50 so that adsorbent 50 is at least partially reactivated. In addition, adsorbent 50 holds such contaminants and odor producing compounds within centrifugal vaporizing means D until an extremely high temperature is reached so that these contaminants and odor producing compounds are completely sterilized and may even be chemically modified so that odor is reduced. It is also believed that a catalytic action occurs at these high temperatures between the various contaminants and odor producing compounds and adsorbent 50.

In accordance with another aspect of the invention, the bottom portion of cylindrical tube 24 may have a fan G secured therein. Fan G includes inner and outer hubs 144 and 146, and a plurality of blades 148 connected between inner and outer hubs 144 and 146. Outer hub 146 may be welded or otherwise secured inside of the bottom end portion of cylindrical pipe 24. The inner surface of inner hub 144 is spaced radially outward from conduit 96 so there will be no contact between rotating and stationary parts. Blades 148 are slanted in a direction to draw air into pipe 24 upon rotation of centrifugal vaporizing means D. This air flows into centrifugal vaporizing means D past the baffling arrangement of flanges 92 and 100, and further prevents steam from being discharged through cylindrical tube 24. In addition, operation of centrifugal vaporizing means D in a dry condition will also result in complete burning and oxidation of organic solids because of the air provided to the interior thereof by fan G. This flow of air also provides excess oxygen to facilitate reactivation of adsorbent 50. Contaminants and odor producing compounds adsorbed onto adsorbent 50 may then react with the excess oxygen to form other compounds and themselves be oxidized and driven from adsorbent 50.

Fans 138 and 140, of the same construction as fan G, may also have their inner hubs 144 secured as by welding or the like to the outer periphery of cylindrical tubes 24 and 26. Fans 138 and 140 have their blades slanted for causing air flow toward bearings 58 and 60 to provide cooling action.

In accordance with another arrangement, as shown in FIG. 4, an electric motor H having an output shaft 150 driving pulley 152 may be provided for rotating centrifugal vaporizing means D through belt 84 connected with pulley 86 on cylindrical tube 24. Motor H may be electrically connected in circuit with the ignition system of a human conveyance or may be connected with a motor driven generator at a fixed installation. It will also be recognized that motor H may be electrically connected in circuit for operation when a boat or a camping trailer is plugged into an independent electrical supply as at a dock or at a campground. FIG. 4 also shows electrical heating elements 156 coiled around centrifugal vaporizing means D and mounted on a circumferential reflector unit 158. It will be recognized that electrical heating elements 156 may be used in combination with coils 124 and 126 of the exhaust pipe from a fuel burning engine. That is, electrical heating elements alone may be provided or they may be provided in combination with the coils of an exhaust pipe so that centrifugal vaporizing means D may be heated by both exhaust gases and electricity or by only one. Electrical heating elements 156 may also be connected in circuit with the ignition system of a human conveyance or may be connected in circuit to be energized when a boat or camping trailer is plugged into an independent electrical supply at a dock or camp site. For example, when a boat is at dock and its engine is not running, it will normally be connected to a source of electricity provided at the dock. Motor H may then be run to rotate centrifugal vaporizing means D, and to operate electric heating elements 156, so that organic and liquid waste material may be vaporized when a boat is in dock.

It will be recognized that centrifugal vaporizing means D may be positioned for rotation on either a vertical or horizontal axis. In addition, centrifugal vaporizing means D may be heated by waste heat from a fuel burning engine; by an independent gas burner; or by electrical heating elements. Heating of centrifugal vaporizing means D may be accomplished by one or a combination of such heating means. Two or more of such heating means may be provided to heat centrifugal vaporizing means D simultaneously or in the alternative whether centrifugal vaporizing means D is mounted for rotation on a horizontal or vertical axis.

In the arrangement shown in FIG. 6, centrifugal vaporizing means D is mounted for rotation on a horizontal axis. In the arrangement shown, cylindrical tube 26 may define the terminal outlet for exhaust from a fuel burning engine. Exhaust tailpipe 121 extends through cylindrical tube 24 and enters the interior of centrifugal vaporizing means D. The terminal portion of exhaust tailpipe 121 is provided with an outwardly extending flange 162 and a cylindrical flange 164 which overlaps cylindrical flange 92 of baffle member 90. Conduit 96 terminates adjacent deflector member 44 so that waste material pumped from waste tank C by pump 16 is thrown radially outward by deflector 44. Exhaust gases from the fuel burning engine also enter the interior of vaporizing means D through exhaust tailpipe 121 to mix with the waste material as the exhaust gases are deflected radially outward by deflector member 44. The exhaust gases flowing through the interior of centrifugal vaporizing means D will heat the vaporizing means so that operation thereof is substantially the same as that described with respect to FIG. 1. It will be recognized that outlet conduit 107 of FIG. 1 is unnecessary in the embodiment of FIG. 6 as steam and exhaust gases simply pass together out through cylindrical tube 26. In previous arrangements where exhaust gases from the fuel burning engine directly contacted waste material, it was possible that the high velocity flow of exhaust gases would carry unvaporized liquid droplets or particles of organic contaminants to atmosphere. With the arrangement described, centrifugal force holds the waste material against the outer periphery of centrifugal vaporizing means D so that substantially only pure vapor is allowed to pass with the exhaust gases out through cylindrical tube 26. In the arrangement of FIG. 6, it will be recognized that it is also possible to provide electrical heating coils 156 to either supplement heating of centrifugal vaporizing means D or for use when the fuel burning engine is not operating. It will also be recognized that the circumferential heat reflector of FIG. 4 may be utilized with either electrical heating elements or with coils of an exhaust pipe from a fuel burning engine. The arrangement of FIG. 6 may also be mounted for rotation on a vertical axis.

It will be recognized by those skilled in the art that centrifugal vaporizing means D may take many different forms and shapes, and may be mounted in various ways. For example, centrifugal vaporizing means D may have an outer peripheral wall 23 which is curved radially outward to define a portion of a sphere. It is also possible to provide baffles to prevent creeping of liquid from vaporizing means D and the exhaust outlet. For example, it is possible to provide a circumferential flange projecting downwardly from the inner surface of upper portion 22 in FIG. 1 with the circumferential flange being spaced intermediate basket 48 and flange 106 of outlet conduit 107. In addition, the outer periphery of vaporizing means D may be recessed to receive a single arcuate coil of exhaust pipe 121. The arcuate coil and the outer periphery of vaporizing means D may also have radially extending circumferential fins which are interdigitated in spaced relationship to improve heat transfer.

Other arrangements may also be provided for supplying air to vaporizer D. For example, fan G may be omitted and an air pump connected with conduit 96 through a one-way ball check valve. The air pump may then operate constantly so that air is mixed with waste material entering conduit 96 through conduit 18, or the air pump may be operated only when pump 16 is off.

Figure 8:
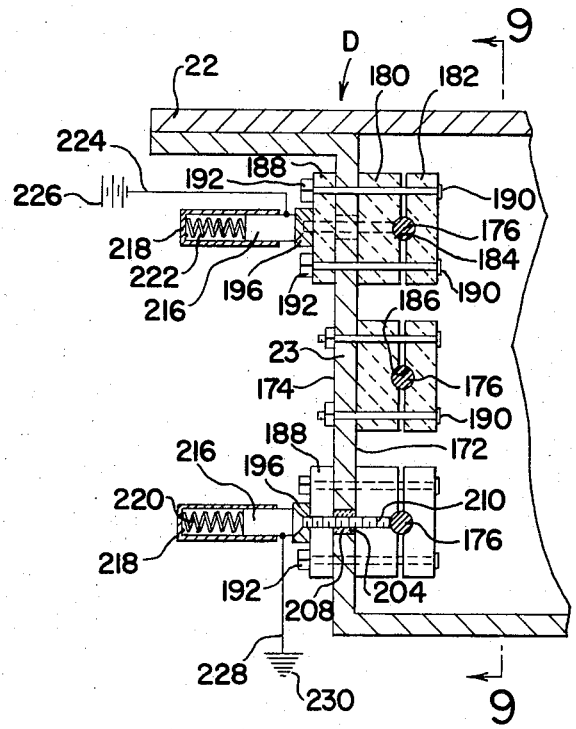
FIG. 8 is a partial cross-sectional elevational view showing another arrangement for electrically heating the improved centrifugal boiler.
Figure 9:
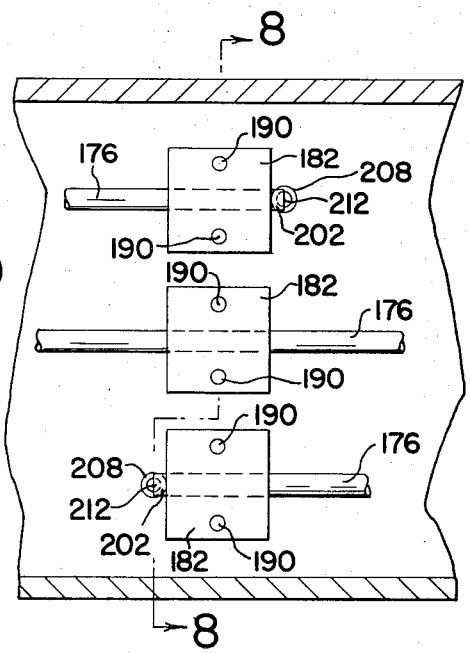
FIG. 9 is a cross-sectional elevational view looking in the direction of arrows 9—9 of FIG. 8.
Figure 10:
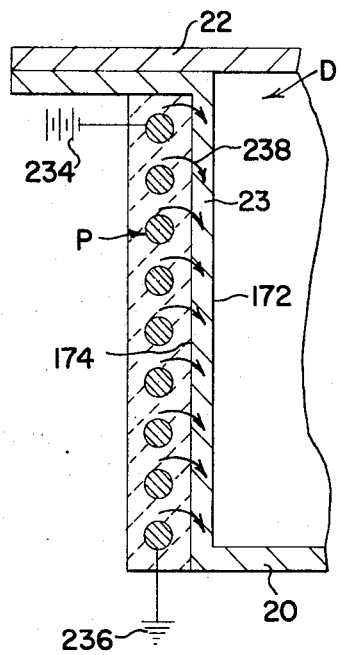
FIG. 10 is a partial cross-sectional elevational view showing another arrangement for heating the improved centrifugal boiler.

In accordance with another arrangement, an electrical resistance heater may be positioned inside of vaporizing means D for heating vaporizing means D and vaporizing waste material fed thereto. As shown in FIG. 8, peripheral wall 23 of vaporizing means D includes inner and outer peripheral surfaces 172 and 174. A spirally coiled electrical resistance heating element 176 is positioned within vaporizing means D and mounted to inner peripheral surface 172 by electrical insulating blocks 180 and 182 of ceramic material or the like. Electrical insulating blocks 180 and 182 have arcuate grooves 184 and 186 therein for receiving and tightly clamping heating element 176 therebetween. A band 188 of electrical insulating material, such as phenolic, is positioned around outer peripheral surface 174 opposite electrical insulating blocks 180 and 182. Aligned holes are formed through wall 23, blocks 180 and 182, and band 188 for receiving holes 190 which have nuts 192 placed thereon for tightly clamping blocks 180 and 182 together to grip resistance heating element 176; to clamp block 180 tightly against inner peripheral surface 172; and to clamp band 188 tightly against outer peripheral surface 174. Blocks 180 and 182 are placed at circumferentially spaced intervals on adjacent coils of heating element 176 for tightly clamping heating element 176 inside of vaporizing means D.

In one arrangement, electrical conducting copper bands 196 are secured to bands 188 by suitable screws extending through holes and bands 196 and threaded into threaded bores in insulating bands 188. At the opposite terminal ends 202 of heating element 176, holes 204 are formed completely through peripheral wall 23 adjacent a side edge of insulating blocks 180 and 182 in alignment with terminal end portions 202 of heating element 176. Electrical insulating bushings 208 as of ceramic material are positioned in holes 204. Elongated screws 210 extend through bands 196 and 188, and through bushings 208 to make electrical connections as at 212 with end portions 202 of heating element 176. Elongated screws 210 establish electrical connection between conducting bands 196 and heating element 176. Suitable gasketing material may be positioned beneath insulating blocks 180 in contact with inner peripheral surface 172 to insure that there will be no leakage from the holes through which screws 190 and 210 extend.

Carbon brushes 216 are slidably mounted in holders 218 and biased into engagement with conducting bands 196 by coil springs 220. One carbon brush 216 is electrically connected by lead 224 with a source of electrical potential and energy 226. The other carbon brush 216 is electrically connected through a conductor 228 with ground as at 230. Suitable switches may be provided for energizing and de-energizing electrical heating element 176.

In accordance with another arrangement, an induction coil P is positioned in surrounding relationship to outer peripheral surface 174 of peripheral wall 23. Induction coil P may be connected to a source of potential energy 234 at one end and to ground as at 236 at its other end. The flow of electrical current through induction coil P creates flux as at 238 which induces current in wall 23 and results in heating thereof. Suitable switch means may be provided for energizing and de-energizing induction coil P.

While the invention has been described with reference to certain preferred embodiments, it is obvious that equivalent alterations and modifications will occur to others skilled in the art upon the reading and understanding of this specification. The present invention includes all such equivalent alterations and modifications and is limited only by the scope of the claims.

Having thus described my invention, I claim:

1. A method for disposing of liquid and organic waste material comprising the steps of: feeding liquid and organic waste material to a vaporizing means, rotating said vaporizing means for subjecting said waste material to centrifugal force therein so that said organic material is forced below the surface of said liquid waste material, filtering said waste material through an adsorbent positioned in said vaporizing means, and supplying heat to said vaporizing means to vaporize said waste material whereby substantially pure liquid is turned into vapor and substantially no organic material is carried from said vaporizing means with the vapor.

2. The method of claim 1 and including the step of cutting off supply of waste material to said vaporizing means while continuing to supply heat thereto to raise the temperature of said vaporizing means substantially above the boiling point of water so that organic material in said vaporizing means is incinerated and said adsorbent is at least partly reactivated.

3. The method of claim 2 and further including the step of feeding air to said vaporizing means while the temperature thereof is substantially above the boiling point of water so that organic material in said vaporizing means is oxidized and said adsorbent is further reactivated.

4. A method for disposing of liquid and organic human bacteriological waste material comprising the steps of: feeding said waste material to a centrifugal vaporizing means having imperforate walls, subjecting said waste material to centrifugal force within said vaporizing means by rotating said vaporizing means at an angular velocity sufficiently great so that centrifugal force acting on organic particles in said waste material carries said particles beneath the surface of the liquid, heating said vaporizing means to vaporize said waste material therein while said waste material is under centrifugal force to produce vapor, and discharging said vapor from said vaporizing means.

5. The method of claim 4 wherein said waste material is vaporized at a predetermined rate and said step of feeding said waste material to said vaporizing means is carried out by metering flow of said waste material to said vaporizing means at a rate not greater than said predetermined rate.

6. The method of claim 5 wherein said vaporizing means is rotated at an angular velocity greater than the critical speed thereof.

7. The method of claim 6 and further including the step of periodically stopping said feeding of waste material to said vaporizing means, and supplying air to said vaporizing means while continuing rotation and heating of said vaporizing means.

8. The method of claim 4 wherein said vaporizing means is rotated at an angular velocity greater than the critical speed thereof.

9. The method of claim 4 and further including the step of periodically stopping said feeding of waste material to said vaporizing means, and supplying air to said vaporizing means while continuing rotation and heating of said vaporizing means.

10. The method of claim 4 and further including the step of filtering said waste material through adsorbent material positioned in said vaporizing means.

11. The method of claim 4 and further including the step of periodically stopping the feeding of said waste material to said vaporizing means while continuing to rotate and heat said vaporizing means to incinerate accumulated organic solids in said vaporizing means.

References Cited

UNITED STATES PATENTS

| 3,568,838 | 3/1971 | Applegren | 210—179 |
| 2,678,450 | 5/1954 | Simpson et al. | 4—10 |
| 3,396,088 | 8/1968 | Bechard | 159—6 R |
| 3,255,805 | 6/1966 | Bechard | 233—11 |
| 3,496,016 | 2/1970 | Siepe et al. | 210—179 X |

SAMIH N. ZAHARNA, Primary Examiner

U.S. Cl. X.R.

4—10; 159—6 R; 210—63, 152, 179